US006574572B2

(12) United States Patent
Bechhoefer

(10) Patent No.: US 6,574,572 B2
(45) Date of Patent: Jun. 3, 2003

(54) REDUCING VIBRATION USING QR DECOMPOSITION AND CONSTRAINED OPTIMIZATION

(75) Inventor: Eric Robert Bechhoefer, New Haven, VT (US)

(73) Assignee: Simmonds Precision Products, Inc., Vergennes, VT (US)

( * ) Notice: Subject to any disclaimer, the term of this patent is extended or adjusted under 35 U.S.C. 154(b) by 9 days.

(21) Appl. No.: 09/846,731

(22) Filed: May 1, 2001

(65) Prior Publication Data

US 2002/0095242 A1 Jul. 18, 2002

Related U.S. Application Data

(63) Continuation-in-part of application No. 09/812,766, filed on Mar. 20, 2001, which is a continuation of application No. 09/512,690, filed on Feb. 24, 2000.
(60) Provisional application No. 60/262,533, filed on Jan. 18, 2001.

(51) Int. Cl.[7] .................. G01F 17/00; G01F 23/00; G01L 7/00; G01N 11/00; G06F 19/00
(52) U.S. Cl. ............... 702/56; 416/61; 416/144; 416/500; 244/17.13; 244/17.27
(58) Field of Search ................ 702/56; 416/61, 416/144, 500; 244/17.13, 17.27

(56) References Cited

U.S. PATENT DOCUMENTS

| 3,945,256 A | 3/1976 | Wilson et al. ............. 73/455 |
| 4,937,758 A | 6/1990 | Hayden et al. ........... 700/280 |

OTHER PUBLICATIONS

Ventres, S. et al., "Rotor Tuning Using Vibration Data Only", presented at the American Helicopter Society 56th Annual Forum, Virginia Beach, Virginia, May 2–4, 2000.

Ventres, S., "Rotor Balancing Without A Tracker", Digital System Sciences/Vibro–meter/Meggitt PLC, Middletown, RI, USA, Paper No. 83, Oct. 2000.

XP–002107205; "*Mathematical Modeling of a Helicopter Rotor Track and Balance Theory*" by A. Rosen et al.; Faculty of Aerospace Engineering, Technion—Israel Institute eof Technology, Haifa, Israel; Jul. 18, 1996.

XP–001011810; "*New Rotor Trim and Balance System for Helicopter Usage Monitoring*" by T.A. Staub et al.

Rotor Balancing Without a Tracker, Sam Ventres, Digital System Sciences/Vibro–meter/Meggitt PLC, Middleton, RI, USA.

Rotor Tuning Using Vibration Data Only, Sam Ventres, Richard E. Hayden, BFGoodrich Aerospace, Fuel and Utility Systems, Bedford, MA 01730.

*Primary Examiner*—John Barlow
*Assistant Examiner*—Anthony T Dougherty
(74) *Attorney, Agent, or Firm*—Choate, Hall & Stewart

(57) ABSTRACT

Determining adjustments for rotating blades includes measuring a plurality of vibration values corresponding to vibrations caused by the blades, providing coefficient of vibration data that corresponds to effects on vibration caused by adjustments to the blades, applying the coefficient of vibration data to the vibration values, and solving for possible values for the adjustments that may be applied to the blades, wherein the possible values for the adjustments are constrained to be greater than a first predetermined value or zero. The adjustments may include at least one of hub weights, blade tabs, PCR adjustments, and blade tip weight adjustments. Measuring vibrations may include obtaining signals from a plurality of accelerometers. Determining adjustments may also include performing an FFT on the vibration data, where the data indicating effects on vibration is provided in the frequency domain. Applying the data to the vibration values may be performed in the frequency domain.

36 Claims, 9 Drawing Sheets

REDUCING VIBRATION USING QR DECOMPOSITION AND CONSTRAINED OPTIMIZATION

CROSS REFERENCE TO RELATED APPLICATIONS

This application is a continuation in part of U.S. patent application Ser. No. 09/812,766, filed on Mar. 20, 2001 (pending) which claims priority to provisional patent application No. 60/262,533 filed on Jan. 18, 2001 and which is a continuation in part of U.S. patent application Ser. No. 09/512,690, filed on Feb. 24, 2000 which is incorporated by reference herein.

BACKGROUND OF THE INVENTION

1. Field of the Invention

This application relates to the field of vibration analysis and more particularly to the field of performing vibration analysis for the purpose of providing device adjustments that reduce vibrations.

2. Description of Related Art

Rotors which propel helicopters and other propeller-driven aircraft induce vibrations in the structure supporting the rotor. The vibrations occur at frequencies that correspond to the shaft rotation rate and harmonics thereof. The vibrations may result in a structural damage, crew fatigue, and ultimately become one of the factors limiting the maximum forward speed of the aircraft. Similar types of vibrations are produced by fans and compressors and fixed installations as well as by marine propellers.

A primary source of the vibration problem is non-uniform air loads on the blades, although mass imbalance is not uncommon. Aerodynamic anomalies, however, tend to develop recurrently due to blade wear, damage, deformation, etc. The aerodynamic and mass and stiffness distribution anomalies have often been called "tracking faults", since a primary observable feature of the uneven airloads or mass distribution is it tendency for the blades to flap and/or deflect unevenly, and thus follow different "tracks". The troublesome manifestation of the aerodynamic and mass imbalance, however, is usually the 1/rev and n/rev vibrations and not the track deviations themselves.

It is possible to modify the vibration characteristics of a helicopter by "rotor trimming", which involves adjusting the weight of the blades at the hub, the tab setting at one or more blades, and the adjustment on the pitch rods. However, determining the effect of each of these adjustments may be difficult because the interdependence of the adjustments. This interdependence may be the source of some difficulty with trial and error methods of rotor trimming, which may allow variation of only one type of adjustment at a time. One set of adjustments may be thrown out of kilter by a subsequent step in the process, requiring repetitive adjustments which may or may not converge to an acceptable state.

Some helicopter rotor trim balancing methods rely, at least in part, upon making the track of each blade identical using, for example, known optical methods. Optical methods, however, employ bulky equipment which relies upon an operator in the co-pilot seat and procedures which require considerable flight time. Furthermore, optical methods cannot always "see" the blades during a complete revolution and thus cannot be expected to achieve perfect aerodynamic trim. Thus, it is desirable to trim the rotor without having to resort to optical tracking. Fortunately, mechanically balancing the rotors to reduce vibrations often has the desirable effect of improving the rotor track.

Mechanical balancing of rotors with mass imbalance may, in some cases, be performed with a single accelerometer and a shaft-phase reference sensor. However, uneven air loads may not be fully diagnosed and corrected with such a technique. Other techniques used to perform the rotor smoothing function may rely upon optical tracking in conjunction accelerometers. Known rotor smoothing systems, however, process vibration data in such a way that there may be an inherent ambiguity in the interpretation of the signatures. The ambiguity comes about because, in many cases, the number of channels processed simultaneously is inadequate to fully separate translational and rotational acceleration components at a given point. Thus, the motion of the helicopter (and in particular the rotor support) in response to a rotor anomalies may be incompletely specified. Furthermore, some systems may not deduce the corrections needed from the Fourier coefficients related to each anomaly.

U.S. Pat. No. 4,937,758, which is incorporated herein by reference, attempts to address these problems by disclosing techniques that take into account the interdependence of the adjustments. However, the system disclosed therein suffers from drawbacks, including difficulties in adequately relating different types of adjustments to each other and difficulties associated with specifying adjustments that do not take into account acceptable granularity, quantization of the adjustments, and maintenance preferences. Furthermore, it is also desirable to minimize the risk associated with a proposed adjustment where the risk corresponds to the size of the adjustment when compared to the maximum allowable adjustment of that type (i.e., it is more risky to make a large adjustment than a small one). In addition, in some instances it is desirable to be able to correlate risks associated with different types of adjustments (e.g., compare the risk associated with an N ounce hub weigh adjustment with the risk associated with an M degree tab bend).

SUMMARY OF THE INVENTION

According to the present invention, determining adjustments for rotating blades includes measuring a plurality of vibration values corresponding to vibrations caused by the blades, providing coefficient of vibration data that corresponds to effects on vibration caused by adjustments to the blades, applying the coefficient of vibration data to the vibration values, and solving for possible values for the adjustments that may be applied to the blades, wherein the possible values for the adjustments are constrained to be greater than a first predetermined value or zero. The adjustments may include at least one of hub weights, blade tabs, PCR adjustments, and blade tip weight adjustments. Measuring vibrations may include obtaining signals from a plurality of accelerometers. Determining adjustments may also include performing an FFT on the vibration data, where the data indicating effects on vibration is provided in the frequency domain. Applying the data to the vibration values may be performed in the frequency domain. The vibration values, the coefficient of vibration data, and the adjustments may all be matrixes. The vibration values may include a first matrix, u, corresponding to measured vibrations and a second matrix, v, corresponding to desired vibrations. Solving for possible values for the adjustments uses the equation $v = u + X \cdot a$, where a represents the adjustment and X represents the coefficient of vibration data. Solving for possible values of the adjustments may include replacing X with $Q \cdot R$, where $Q^T \cdot Q$ equals the identity matrix, I and R is an upper triangular matrix. Solving for possible values of the adjustments includes evaluating $\|Q^T \cdot u + R \cdot a\|$.

According further to the present invention, determining adjustments for rotating blades includes sorting sets of possible adjustments for the blades based on a predetermined criteria and electing a set that is constrained so that all of the adjustments of the set are greater than a first predetermined value or zero. Sorting sets of possible adjustments may include measuring a plurality of vibration values corresponding to vibrations caused by the blades, providing coefficient of vibration data that corresponds to effects on vibration values caused by sets of possible adjustment applied to the blades, applying the coefficient of vibration data to the vibration values to predict an effect on vibration values caused by each of the sets of possible adjustments, and sorting the sets of possible adjustments according to the effect on vibration values for each of the sets. Measuring vibrations may include obtaining signals from a plurality of accelerometers. The predetermined criteria may be a measure of an amount of vibrations caused by a set of adjustments. Determining adjustments for rotating blades may include deselecting sets of adjustments that result in vibrations greater than a predetermined amount. The adjustments may include at least one of hub weights, blade tabs, PCR adjustments, and blade tip weight adjustments.

According further to the present invention, computer software that determines adjustments for rotating blades includes executable code that receives a plurality of vibration values corresponding to vibrations caused by the blades, executable code that accesses coefficient of vibration data that corresponds to effects on vibration caused by adjustments to the blades, executable code that applies the coefficient of vibration data to the vibration values, and executable code that solves for possible values for the adjustments that may be applied to the blades, where the possible values for the adjustments are constrained to be greater than a first predetermined value or zero. The plurality of vibration values may be provided by signals from a plurality of accelerometers.

According further to the present invention, computer software that determines adjustments for rotating blades includes executable code that receives sets of possible adjustments for the blades sorted based on a predetermined criteria and executable code that selects a set that is constrained so that all of the adjustments of the set are greater than a first predetermined value or zero. The computer software may also include executable code that receives a plurality of vibration values corresponding to vibrations caused by the blades, executable code that accesses coefficient of vibration data that corresponds to effects on At vibration values caused by sets of possible adjustment applied to the blades, executable code that applies the coefficient of vibration data to the vibration values to predict an effect on vibration values caused by each of the sets of possible adjustments, and executable code that sorts the sets of possible adjustments according to the effect on vibration values for each of the sets. The vibration values may include signals from a plurality of accelerometers. The predetermined criteria may be a measure of an amount of vibrations caused by a set of adjustments. The computer software may also include executable code that deselects sets of adjustments that result in vibrations greater than a predetermined amount. The adjustments may include at least one of hub weights, blade tabs, PCR adjustments, and blade tip weight adjustments.

According further to the present invention, an apparatus that determines adjustments for rotating blades includes means for receiving a plurality of vibration values corresponding to vibrations caused by the blades, means for accessing coefficient of vibration data that corresponds to effects on vibration values caused by sets of possible adjustments applied to the blades, means for applying the coefficient of vibration data to the vibration values, and means for solving for possible values for the adjustments that may be applied to the blades, where the possible values for the adjustments are constrained to be greater than a first predetermined value or zero. The adjustments may include at least one of hub weights, blade tabs, PCR adjustments, and blade tip weight adjustments. The means for measuring vibrations may include means for obtaining signals from a plurality of accelerometers. The means for receiving a plurality of vibration values may include a first input. The means for accessing coefficient of vibration data may include a second input. The predetermined value may be provided by a third input.

According further to the present invention, an apparatus that determines adjustments for rotating blades includes means for receiving sets of possible adjustments for the blades that are sorted based on a predetermined criteria and means for selecting a set that is constrained so that all of the adjustments of the set are greater than a first predetermined value or zero. The apparatus may also include means for receiving a plurality of vibration values corresponding to vibrations caused by the blades, means for accessing coefficient of vibration data that corresponds to effects on vibration values caused by sets of possible adjustment applied to the blades, means for applying the coefficient of vibration data to the vibration values to predict an effect on vibration values caused by each of the sets of possible adjustments, and means for sorting the sets of possible adjustments according to the effect on vibration values for each of the sets. The vibration values may be provided by signals from a plurality of accelerometers. The predetermined criteria may be a measure of an amount of vibrations caused by a set of adjustments. The apparatus may also include means for deselecting sets of adjustments that result in vibrations greater than a predetermined amount. The adjustments may include at least one of hub weights, blade tabs, PCR adjustments, and blade tip weight adjustments.

DETAILED DESCRIPTION OF THE PREFERRED EMBODIMENT(S)

Figure 1:
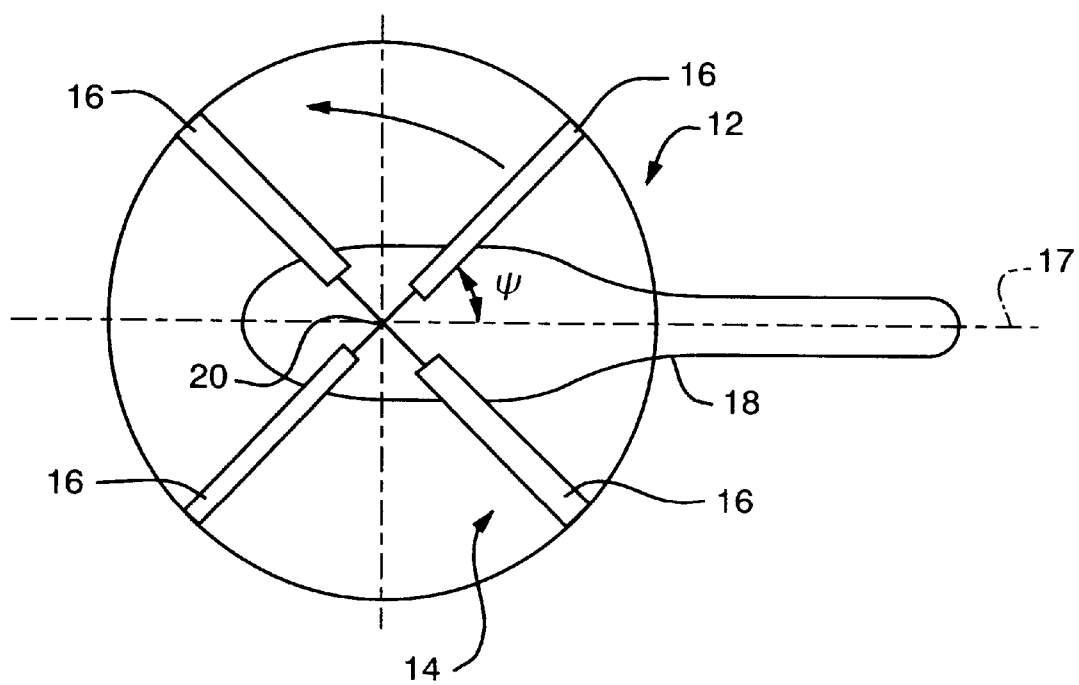
FIG. 1 shows a helicopter that uses the system described herein for measuring and analyzing vibrations.

Referring to FIG. 1, a helicopter 12 is shown having a rotor 14 with a plurality of blades 16. One of the blades 16 may be selected as a reference blade and each of the other blades 16 may be assigned a blade number starting with zero for the reference blade and increasing by one in the direction of rotation. For example, for the four-blade rotor 14 shown in FIG. 1, the blades X may be numbered zero through three. Note that the system described herein may work with a different number of blades such as seven. Generally, for a system with B blades, the blades may each have an assigned blade number from zero through B−1. In addition, in some embodiments, the blades 16 may be identified by assigning a unique color to each blade.

Rotation of the blades 16 generates vibrations in the helicopter 12. As described in more detail below, the vibrations may be measured by sensors and then used as inputs to a process that determines adjustments that can be made to the blades 16 to reduce the vibrations. In some embodiments, the adjustments include hub weights, trailing edge tabs, and PCR changes. Other embodiments may also include tip weights of the blades.

The position of the reference blade may be defined by an azimuth angle $\psi$ between the blade itself and a center line 17 of the fuselage 18 of a rotor hub 20 of the helicopter 12. The blades 16 may be equally spaced, so that the position of a blade may be given by the expression $\psi+(b*\alpha)$, where $\alpha=2\psi/b$ is the inter-blade spacing angle and b is the blade index number, which runs from zero through B−1.

As the rotor 14 turns, the angle $\psi$ increases. One complete rotation corresponds with an increase in $\psi$ of $2\pi$ radians or 360° The rate of rotation of the rotor 14 is usually controlled by an engine governor and thus is substantially constant. Therefore, the azimuth angle is proportional to time, T, and thus may be expressed in terms of T. If the rate of rotation is designated by $\omega$, then $\psi=\omega*T$. In addition, because of the simple relationship between Azimuth angle and T, $\psi$ may also be used as a "dimensionless" measure of time. Motions of the blades 16 and forces of rotor 14, which may normally be thought of as being functions of time, may also be expressed as functions of $\psi$.

Figure 2:
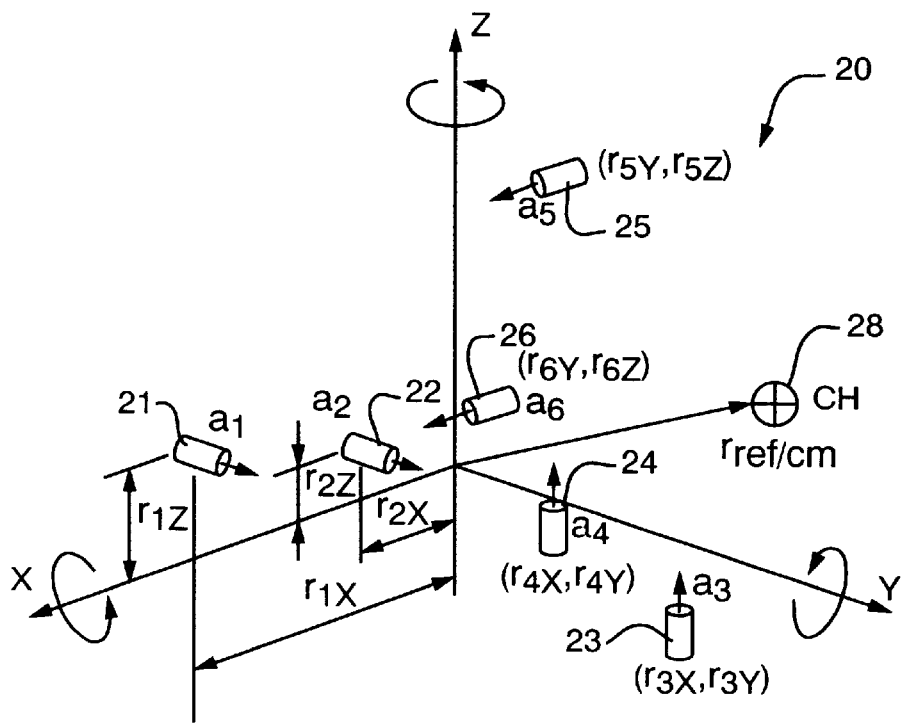
FIG. 2 illustrates a possible placement of accelerometer sensors according to the system described herein.

Referring to FIG. 2, a sensor array 20 includes a plurality of sensors 21–26 that measure vibration of the helicopter 12 near a center of mass at a point 28. The system described herein may be expanded to accommodate additional sensors. In some embodiments, the sensors 21–26 may be arranged in a cube which is mounted so as to allow direct computation of three orthogonal translation and three orthogonal rotational accelerations, as described elsewhere herein. Examples of commercially available sensors that may be used include Part No. CE581M101 Uniaxial accelerometer and/or the Part No. 44-581-000-121 BiAxial Accelerometer, both manufactured by Vibro-Meter Corp.

The sensors 21–24 may be rigidly attached to the helicopter 12, ideally near the center of mass 28 thereof. The x, y, z position of each of the sensors 21–24 with respect to the center of mass 28 may be known, as well as the positive sensing direction of each of the sensors 21–26 and the sensitivities thereof. In addition, the angular position of the rotor 14 may be sensed by one or more tachometers (not shown) that sense the relative position of each of the blades 16 with respect to the center line 17 of the helicopter 12.

The array of sensors 21–26 shown in FIG. 2 utilizes six one degree of freedom accelerometers which may be mounted in pairs. The six uniaxle accelerometers 21–26 may be mounted in convenient positions around the rigid framework of the helicopter 12 such that each of the sensors 21–26 has an axis of sensitivity parallel to one of the reference axes shown in FIG. 2. The location of each of the sensors 21–26 may be specified by first picking a reference point that can be any convenient point on the rigid framework of the helicopter 12 (e.g., a bolt head). If the point that is chosen has known coordinates with respect to the center of mass 28, processing is simplified. From the chosen reference point, which has a reference coordinate system that is parallel to the global coordinate system of the helicopter 12, the Cartesian coordinates of the location of each of the sensor 21–26 may be determined. The coordinates may be represented by $r_{ab}$, where the "a" denotes the number of the sensor and the "b" denotes the component axis thereof.

Figure 3:
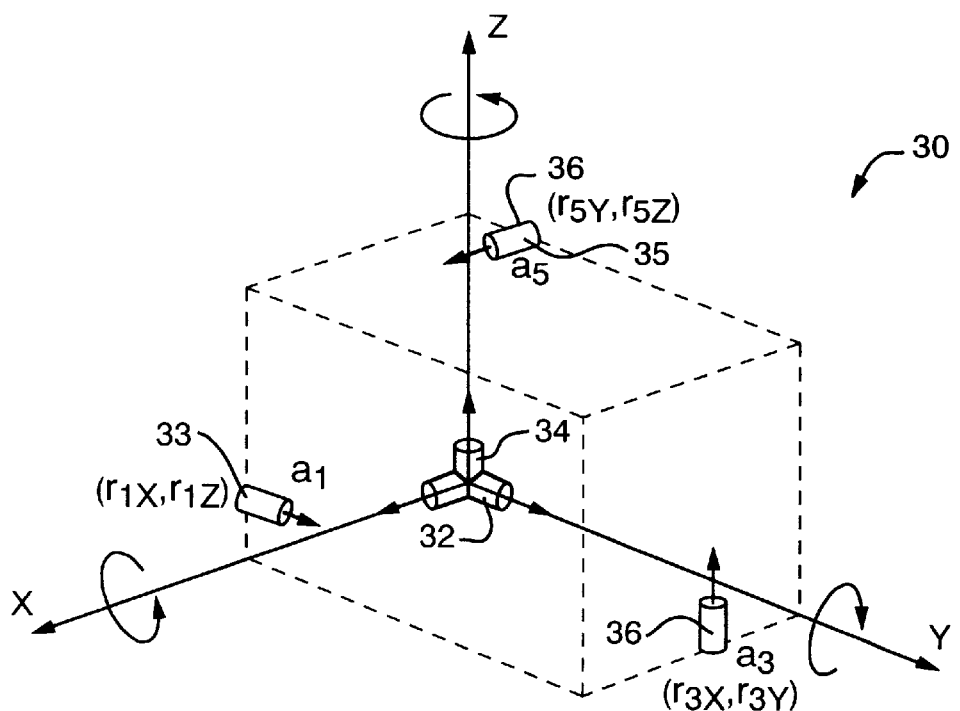
FIG. 3 illustrates an alternative possible placement of sensors according to the system described herein.

Referring to FIG. 3, another embodiment of a sensor array 30 includes a single triaxle accelerometer 32 and three one degree of freedom accelerometers 33–35. The array 30 may use the location of the triaxle accelerometer 32 as a reference point. The output of the triaxle accelerometer 32 may be sufficient to determine the translational acceleration vector of a reference point. Note the array 30 requires fewer sensor locations than the embodiment of FIG. 2. The locations of the three uniaxle accelerometers 33–35 may be determined in a manner somewhat similar to that described above in connection with FIG. 2. Note that the sensor array 20 or the sensor array 30 may be positioned on a single frame to form a six degree of freedom accelerometer and that the frame may be attached to the helicopter 12 as a single entity.

For a system utilizing either the array 20 of FIG. 2 or the array 30 of FIG. 3, the magnitude of the accelerometer vectors, as measured by the accelerometers, are given as a $a_1$, $a_2$, $a_3$, $a_4$, $a_5$, and $a_6$. The reference coordinate axes may be parallel to the mass center line coordinate axes. The position vector from the reference point to the center of mass 28 may be given by $r_{ref/cm}$ with components $X_{ref/cm}$, $Y_{ref/cm}$ and $Z_{ref/cm}$, measured from the reference point to the center mass 28. Note also that the array 20 and/or the array 30 may be part of a portable system that is placed in the helicopter 12 as needed in connection with obtaining data for analysis.

Figure 4:
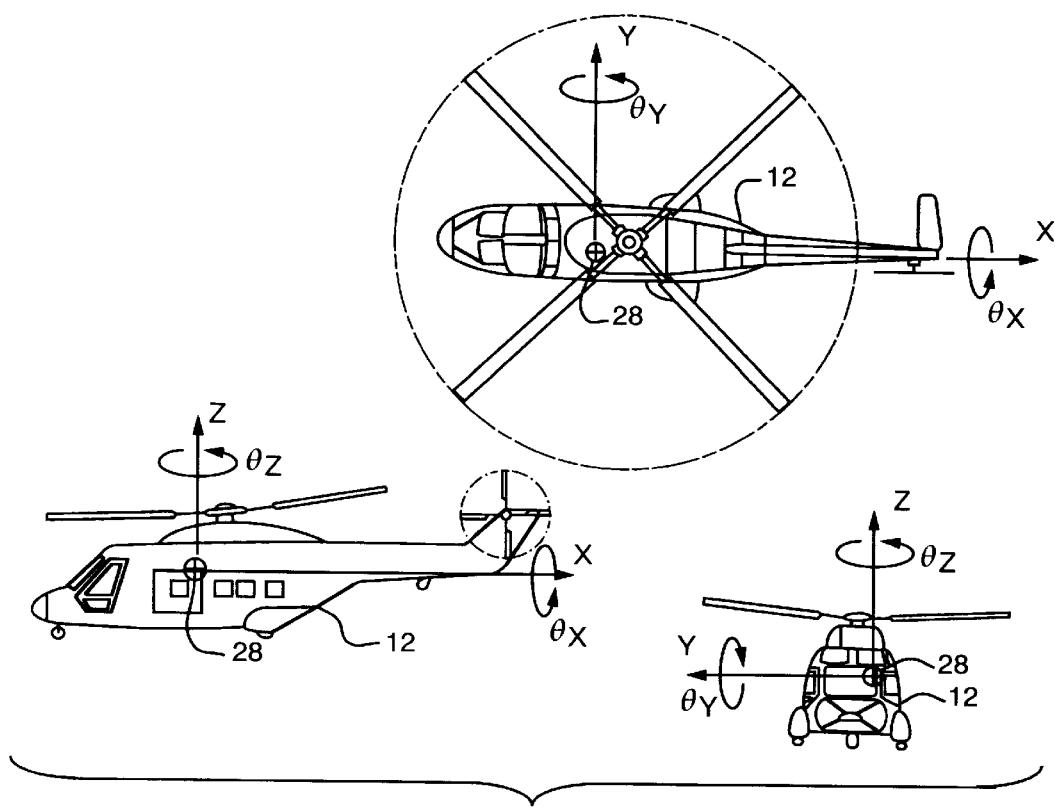
FIG. 4 illustrates different motions detected by the sensors of FIG. 2 and FIG. 3 according to the system described herein.

Referring to FIG. 4, the helicopter 12 is shown from three different positions where the axes of acceleration and the x, y, z and the corresponding rotational accelerations are shown from the center of mass point 28.

Note that the measurements from the sensors may be combined to provide measurement signals of "virtual sensors", which represent vibration values that are desirable to measure and correct for. For example, it may be desirable to have a virtual sensor for the pilot/co-pilot vertical vibrations, which will be determined by, for example, adding the signals from a pair of sensors having vertical axes of orientation near the positions of the pilot and copilot. Similarly, it may be desirable to have a cabin roll virtual sensor, which is determined by taking the difference of the pair of sensors used to determine pilot and copilot vertical vibrations. In one embodiment, the virtual sensors that are measured and processed include pilot/co-pilot vertical, cabin vertical, cabin roll, pilot/co-pilot lateral, cabin lateral, and cabin longitudinal. Note that the pilot/co-pilot lateral virtual sensor may be different from the cabin lateral virtual sensor because the cabin space may move laterally relative to the pilot/co-pilot space in some instances. For the discussion that follows, it is assumed that the sensor inputs that are being processed are the six sensor inputs (virtual sensors) listed above. However, it will be appreciated by one of ordinary skill in the art that different sensors (real and/or virtual) may be used to provide the system described herein.

Figure 5:
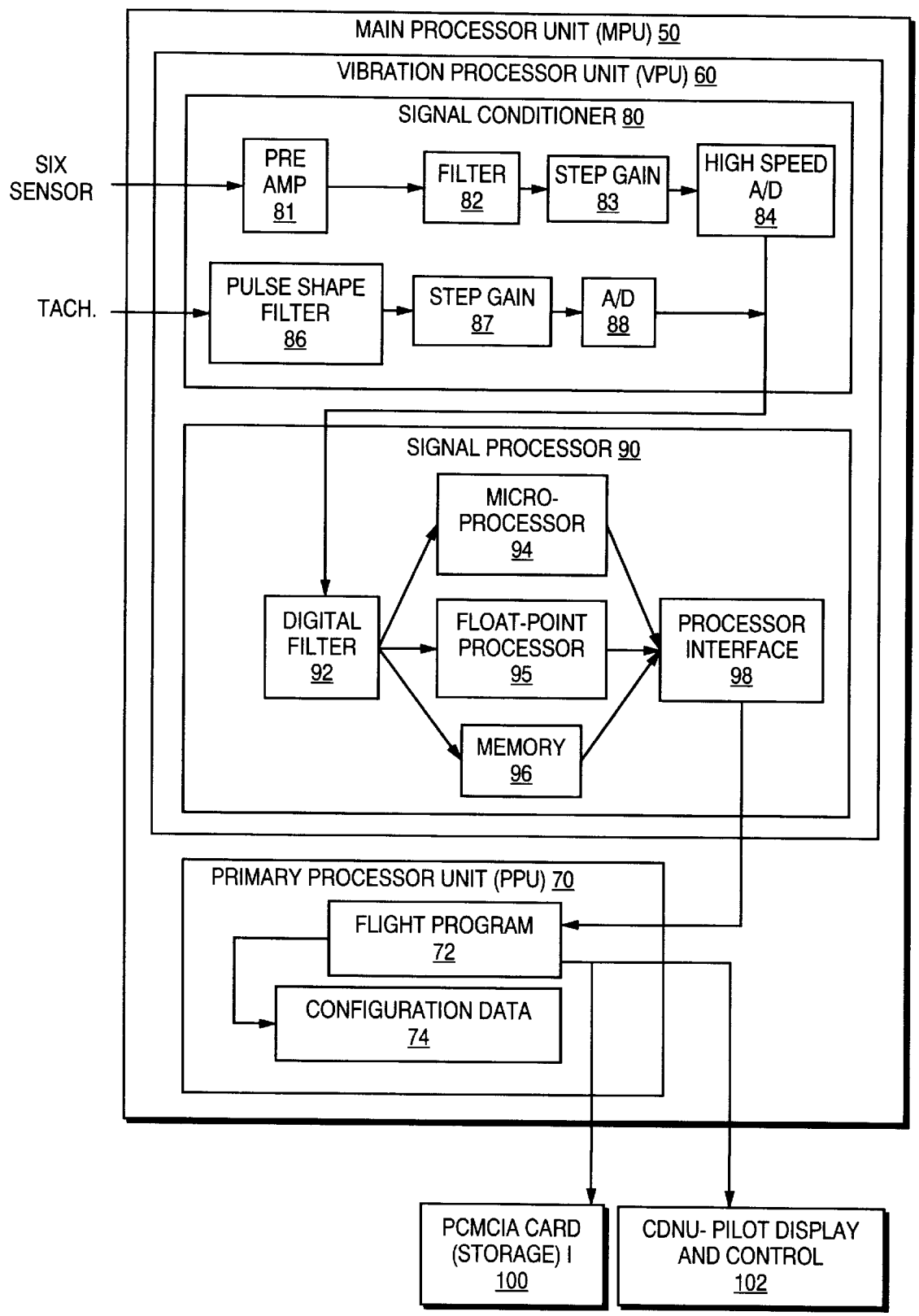
FIG. 5 illustrates processing of accelerometer signals according to the system described herein.

Referring to FIG. 5, data from the six sensors and data from the tachometer(s), which measures the angular displacement of the rotor 14, may be input to a main processor unit 50 which calculates vibrations of the helicopter 12. The main processor unit 50 includes a vibration processor unit 60 and a primary processor unit 70 which are interconnected in a conventional manner. The primary processor unit 70 includes a flight program unit 72 and configuration data unit 74, which are described in more detail herein. The vibration processor unit 60 may be in the same location or a different location than the primary processor unit 70. Similarly, at least some portion(s) of the main processor unit 50 may be fixedly installed in the helicopter 12. Alternatively, the entirety of the main processor unit 50 may be a portable device that is used as needed in connection with analyzing vibrations.

The vibration processor unit 60 includes a signal conditioner 80 and a signal processor 90 connected thereto. The signal conditioner 80 performs initial processing on the six sensor signals and the tachometer signal. The signal processor 90 processes the output of the signal conditioner 80 to provide calculations of the vibrations, as described elsewhere herein.

The signal conditioner 80 includes six pre-amplifiers 81 (one for each of the sensors) for pre-amplifying data input to the signal conditioner 80. Alternatively, the pre-amplifier 81 may be a single pre-amplifier with six channels, or some other arrangement capable of providing pre-amplification of the six sensor signals.

The output of the pre-amplifier 81 is provided to a filter 82, which filters out noise from the signals. In some embodiments, the filter 82 is a low pass filter. The output of the filter 82 is provided to a step gain 83, which adjust the gain of the signals as appropriate for input to a high speed A/D converter 84. The step gain 83 and the high speed A/D converter 84 cooperate to provide an efficient signal range for the processing described herein.

The tachometer signal (or multiple tachometer signals, depending upon the specific implementation) are applied to a pulse shape filter 86 which buffers and provides a low pass filtering of the signal(s) from the tachometer. The output of the pulse shape filter 86 is provided to a step gain 87 and the output of the step gain 87 is provided to an A/D converter 88. As with the sensor signals, the step gain 87 and the A/D converter 88 cooperate to provide an efficient range of signal. The output of the A/D converter 88 and the output of the high speed A/D converter 84 are combined to provide the digital signal output of the signal conditioner 80. Thus, the output of the signal conditioner 80 is the sampled sensor signals and sampled tachometer signal in digital form.

The signal processor 90 receives the output from the signal conditioner 80. The signal processor 90 includes a digital filter 92 that filters the incoming data. The output of the digital filter 92 is provided to a microprocessor 94, a floating point processor 95, and a memory 96, which are arranged in a conventional manner to provide the functionality described herein. The output of the microprocessor 94, and the floating point processor 95, and the memory 96 are provided to a processor interface 98.

The signal processor 90 performs a Fast Fourier transform (FFT) on the input provided thereto from the signal conditioner 80. The FFT converts the time domain data from the six sensors to corresponding Fourier coefficients at a selectable number of harmonics of the 1/rev fundamental. The rotation signal from the tachometer is used to determine the fundamental frequency which is a multiple of the rotation rate of the blades 16.

The output of the signal processor 90 is provided to the primary processor unit 70, which is described in more detail elsewhere herein. The output of the signal processor 90 may also be provided to a storage card 100 and may be displayed to the pilot during flight (or on the ground) with a pilot display and control unit 102.

The sensor data that is collected and provided to the storage card 100 and/or the pilot display and control unit 102 may be used to determine appropriate helicopter blade adjustments to the hub weights, PCR's, and blade tabs (and possibly blade tip weights) to reduce vibration of the helicopter. The algorithm for determining the adjustments may be run either on the pilot display and control unit 102 or may be run using a conventional processor (computer) that is not fixedly installed in the helicopter 12 and/or is not used at all in connection with the helicopter 12. In any case, the algorithm uses the collected sensor data to determine blade adjustments for reducing vibrations.

The sensor data may be collected under different flight conditions, known as "regimes", so that the algorithm for determining blade adjustments that reduce vibrations does so for all regimes and/or is optimized to reduce vibrations for a specific subset of regimes. The regimes may include, for example, the helicopter being on the ground, hovering, 90 knots, 120 knots, and 150 knots. During the data collection process, the pilot may indicate that the helicopter is in a particular regime by pressing a button or otherwise providing appropriate input to the system by, for example, pressing a button on the pilot display and control unit 102. Alternatively, the system may determine when the aircraft is in a particular regime and initiate data collection automatically. Thus, there may be vibration data for each of the sensors (virtual sensors) collected at each of the regimes.

Figure 6:
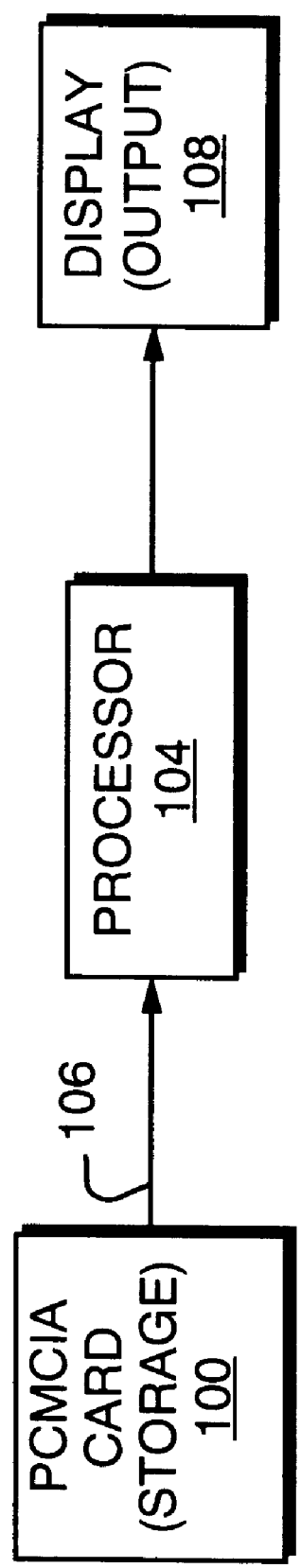
FIG. 6 illustrates a processor for analyzing vibration data according to the system described herein.

Referring to FIG. 6, the storage card 100 is shown being coupled to a processor 104 via a connection 106 therebetween. Collected data may be provided to the processor 104 which determines adjustment information for the blades 16 as described herein. The adjustment information may be provided by the processor 104 to an output, such as a display 108, so that a user, such as a helicopter maintainer, can view the information to determine how to adjust the blades 16. The processor 104 may be implemented by any one of a variety of off-the-shelf computing systems capable of providing the functionality described herein.

A system for indicating blade adjustments to decrease vibrations may include empirical data that indicates the effect of each adjustment. That is, there may be empirical data that provides the change in the vibration caused by each type of adjustment. For example, there may be data that shows that at a particular regime, for a particular sensor (virtual sensor), adjusting the tabs of a blade a particular unit amount effects the vibration a particular amount. The calculations and analysis are performed in the frequency domain because in the frequency domain it is possible to assume a linear relationship between the adjustments and the effects the adjustments have on vibration in the frequency.

Fourier components (amplitude and phase) of the incremental accelerations caused by unit adjustments of the reference blade, (e.g., a 1 degree deflection of a tab, a pitch link adjustment which causes a 1 degree change in blade angle of attack, etc.) are also used. This data may be obtained from flight test data using the system described herein by systematically making adjustments and either changing the Fourier coefficients or performing an analysis and using the data that is specific to each particular helicopter configuration and operating condition. From the data (which pertains to unit adjustments applied to the reference blade), acceleration caused by similar adjustments to other blades may be computed. Based upon a dynamic model of the rotor system, a particular set of adjustments which most nearly negates the measured acceleration (thereby minimizing vibration) is computed.

To simplify a description of the procedure involved, an example will be discussed which considers only one type of rotor blade adjustment, the trailing edge tab settings, and only one flight condition, which need not be specified. The acceleration generated at the rotor hub 20 by a one degree downward deflection of the trailing edge tab on a reference blade might be denoted by the function $T(\psi)$. (Note that $T(\psi)$ may be a vector-valued function having three components $T_{x(\psi)}$, $T_{y(\psi)}$ and $T_{z(\psi)}$, denoting accelerations along each of three orthogonal directions.)

The acceleration generated by a similar 1 degree deflection of the tab on blade b is then $T(\psi+b\Delta)$, and the acceleration caused by a deflection in the amount $a_b$ is $$a_b T(\psi+b\Delta)$$

Finally, the acceleration generated by deflections in the amounts provided on the blades b=0, 1 . . B−1, which may be denoted by $a_{tab}$, is $$a_{tab} = \sum_{b=0}^{B-1} a_b T(\psi + b\Delta)$$

In steady flight, $T(\psi)$ is a periodic function, as all forces generated by the rotor repeat themselves at the interval of rotation of the rotor. Therefore, $T(\psi)$ can be expressed as a Fourier series:

$$T(\psi) = \sum_n T_n e^{-in\psi}$$

In the complex exponential form of the series shown above, the index n is summed over all integers, positive and negative. From hereon in the detailed description where no summation limits are shown, such an indefinite summation is intended.

Generally speaking, the permitted blade adjustments generate pronounced forces and moments at the rotor rotation rate, and have much less effect at higher frequencies. For the complex Fourier series shown above, this means that the components n such that n=+/−1 are the largest in magnitude, and component indices greater than 1 or less than −1 are much smaller.

Using this Fourier series for a unit deflection of the tab on the reference blade, it can be shown that the acceleration $a_{tab}$ generated by arbitrary tab deflections on all blades is:

$$a_{tab} = \sum_n A_n T_n e^{-in\psi}$$

In the equation above, the set of quantities $\{A_n\}$ are the discrete Fourier transform of the set of tab deflections $\{a_b; b=0, 1 . . B-1\}$:

$$A_n = \sum_{b=0}^{B-1} a_b e^{-inb}$$

The $A_n$ are generally complex numbers. They form an infinite periodic sequence, the period being the number of blades, B. Because the tab settings $a_b$ are real numbers, the $A_n$ have the following property (*denotes the complex conjugate):

$$A_{B-n} = A_n^*$$

Combining this property with the periodicity of the sequence, it can be shown that $A_0$ is a real number, as is $A_{B/2}$, if B is even.

As can be seen in the equation for $a_{tab}$, the $A_n$'s form a frequency mask. If a particular $A_n$ is zero, then the corresponding frequency is not present in the Fourier series for the incremental acceleration caused by the tab settings, $a_b$. For example, if on a four blade rotor the trailing edge tabs on each pair of opposing blades are given the same setting, the associated blade forces and motions substantially replicate themselves twice each revolution, so that no net forces are generated at the rotor rotation rate.

The acceleration measured on an untrimmed rotor (the vibration which is to be minimized) is also a (vector-valued) periodic function, and so can be expressed as a complex Fourier series:

$$a = \sum_n a_n e^{-in\psi}$$

This series is a mathematical representation of the data provided by the signal processor 90. Including now the additional acceleration caused by the tab deflections, the total acceleration can be calculated as:

$$a + a_{tab} = \sum_n (a_n + A_n T_n) e^{-in\psi}$$

The vibrations are thus analyzed in the frequency domain, allowing determination of many orders of effects.

A basic equation for analyzing the vibrations as well as the effect of adjustments to the blades is:

$$v = u + X \cdot a$$

where v represents the vibrations after adjustment, u represents the vibration before adjustment, a represents the adjustment, and X represents coefficient of vibration data that corresponds to effects on vibration caused by the adjustments. All of the quantities are multivalued and thus are represented as matrixes. The values for X are determined in a manner consistent with that described above for empirically determining the effect of adjustments on acceleration (vibration).

The matrixes u and v may be k by one matrixes where k equals the number of harmonic orders of interest (i.e., the number that are analyzed) multiplied by the number of regimes. If there are three adjustments (i.e., tabs, PCR's and hub weights), then a is a three by one matrix and X is a k by three matrix. Note that, if it is desirable to include tracking data, the data can be added to the u and v arrays and added to the X array in the same way that a new regime would be added. In that case, the calculations discussed herein for minimizing vibrations would, in fact, be minimizing and performing calculations on the combination of vibrations and track data.

The goal is to solve for a so that v represents a relatively low amount of vibration (or, as discussed above, a combination of vibration and track data, which will be hereinafter referred to as vibration for simplicity). The amount of vibration associated with v is $\|v\|$ (the norm of the matrix v). Ideally, it is desirable to drive $\|v\|$ to zero (i.e., have all entries of the matrix equal zero). However, doing so in many instances results in a somewhat large (and thus risky) set of suggested adjustments. In addition, since there may be errors inherent in the system due to errors in adjustment, measurement, calculating the effects of adjustments, etc., then it is not necessary to drive $\|v\|$ to zero. Instead, it is sufficient to cause $\|v\|$ to be less than a predetermined value, $\delta$. In some embodiments, $\delta$ may be set to the sum of all of the expected values of errors associated with an adjustment. Note that, although it may not be possible to know with certainty where errors are specifically occurring (e.g., the measurement of coefficients or the adjustments themselves), it is still possible to estimate the total expected error. Note further that different sets of adjustments that fall within the total expected error are indistinguishable in terms of predicting their ability to improve the vibration characteristics of the aircraft.

The following solves for the adjustment, a, using the constraint that $\|v\|<\delta$.

QR decomposition is a known technique that may be used to solve matrix equations. In this instance, matrixes Q and R are chosen so that Q·R equals X. In addition, QR decomposition provides that Q is such that $Q^T \cdot Q$ equals I, the identity matrix. Thus, $$v = u + Q \cdot R \cdot a$$

multiplying through by $Q^T$ yields:

$$Q^T \cdot v = Q^T \cdot u + R \cdot a$$

since $\|v\|<\delta$ and multiplying v by $Q^T$ simply scales the norm of v, then:

$$\|Q^T \cdot u + R \cdot a\| < \delta \text{ (or a different } \delta, \text{ scaled by } \|Q^T\|)$$

How the equation set forth above may be used to solve for a is discussed in more detail below.

In the course of solving for a, it is possible to find a solution in a way that minimizes vibrations at the fundamental frequency and/or the harmonics by performing the computations set forth above using a subset of the matrixes corresponding to the frequencies of interest. However, because the adjustments affect vibrations at all of the frequencies, in some instances it is possible that an adjustment will decrease vibrations at one frequency while increasing vibrations at another frequency. On the other hand, there is a relationship between the vibrations at various frequencies such that optimizing on the shaft order S provides for simultaneous adjustment on any frequency corresponding to the following:

$$(N \times B) +/- S$$

where N is an integer and B corresponds to the number of blades. Thus, optimizing on the first order frequency (i.e., S=1) for a seven blade helicopter also affects the 6th and 8th orders (N=1), the 13th and 15th orders (N=2), etc. In other words, $a_{F1} = a_{F2}$ in instances where F1 and F2 obey the relationship set forth above. Note that the even in instances where F1 and F2 meet the criteria set forth above, $X_{F1}$ does not necessarily equal $X_{F2}$.

Note that, for embodiments where the blade adjustments include hub weights, tabs, and PCR's, it is necessary to provide a mechanism to correlate the various values. Otherwise, it is difficult to determine how to compare, for example, one ounce of weight for a hub weight adjustment with one degree of tab deflection. In embodiments disclosed herein, adjustment values used, for example, in the X array and the a array, are normalized according to a maximum value for each adjustment. Thus, if the maximum hub weight adjustment is, for example, twenty ounces, then one ounce would be represented as 0.05. Similar normalization may be used for the PCR adjustments and the tab deflection adjustments (and possibly blade tip weight adjustments). Normalizing the adjustment values allows for computations that compare and/or combine the values. In addition, normalizing by one over the maximum allowable amount for each of the types of adjustment provides a weighting that compensates values for each type of adjustment according to the percent of the allowable range represented by a particular adjustment.

In one embodiment, normalization occurs by computing a weight norm matrix:

$$a^T \cdot E \cdot a$$

where E is a diagonal matrix where the diagonal elements equal the inverse of the maximum amount for each physical adjustment. Thus, if the maximum PCR adjustment is twenty clicks, the diagonal element of E corresponding to the PCR adjustment is $\frac{1}{20}$. That way, any PCR values in the a matrix are normalized according to the maximum PCR adjustment, within the objective function of the optimization. Hub weight and tab adjustments are similarly normalized, thus making it possible to correlate the risks (i.e., the amount of change) associated with different types of adjustments. For example, for purposes of risk assessment, a weight adjustment that is one half of the maximum allowable weight adjustment is equivalent to a tab adjustment that is one half of the maximum allowable tab adjustment. Note that it is possible to normalize using values that are different from the maximum range of each of the adjustments.

The system discussed herein minimizes the weight norm matrix, $a^T \cdot E \cdot a$, subject to the constraint discussed above of $\|Q^T \cdot u + R \cdot a\| < \delta$. Minimization of $a^T \cdot E \cdot a$ may be performed using any one of a variety of conventional techniques, such as the Newton-Raphson technique.

Once an appropriate value for a is found, it is necessary to convert the calculated adjustment, which is expressed in the a matrix in the Fourier domain, back to a real adjustment. This may be performed by multiplying the a matrix by an inverse DFT matrix, where each of the rows of the inverse DFT matrix correspond to the blade to be adjusted and each of the columns corresponds to the adjustment type. Note that for a system with B blades, there will be B−1 rows since only B−1 blades (at the most) are adjusted. Note further that, for weight adjustments, such as hub weights, only two blades at most need be adjusted, since hub weights appear to have no effect on higher order vibrations.

The inverse DFT matrix is a B×B matrix. Elements of the inverse DFT matrix are given by:

$$\frac{1}{B} e^{i 2 \pi p b / B}, b, p = 1 \ldots B$$

where p and b indicate the position in the inverse DFT matrix.

In other embodiments, a different value for δ may be chosen. Note that it is possible to trade off values for δ and risk. That is, increasing δ would tend to decrease the risk by increasing the solution space for acceptable adjustments. Similarly, decreasing δ would tend to increase the risk.

In some instances, it may be desirable to constrain the adjustments so that minimal adjustments are avoided. For example, it may be desirable to constrain the tab adjustments so that the suggested tab bend adjustment is more than two degrees. This is useful in that it avoids minor adjustments, which are sometimes difficult to perform. Note also that this goal is attained if an adjustment is zero (i.e., if there is no adjustment at all). That is, the adjustments may be constrained so that each adjustment (i.e., the absolute value of each adjustment) is either zero or more than a certain, predetermined value. For example, in the case of the tabs, the tab adjustments may be constrained so that the suggested adjustment is either no tab adjustment at all or a tab bend of more than two degrees, in either direction.

Of course, it is desirable to provide adjustments according to the constraints described above while still minimizing the risk of the adjustments. This problem may be addressed by providing a plurality of conditions that are solved using a non-linear program solver such as the GAMS/MINOS non-linear program solver, which is commercially available from GAMS, Inc. of Washington, D.C. Note that any other relaxed integer non-linear solver may be used in connection with the problem described herein. The conditions that are provided to the solver are the following:

$$\min \sum_i \sum_j A_{i,j} \cdot E_i \cdot A_{ij} \quad (1)$$

s.t $$\forall_{i,j} \quad B_{i,j} + \sum_{ii} R_{i,j} \cdot A_{i,j} = D_{i,j} \quad (2)$$

$$\forall_j \quad \sqrt{\sum_j D_{i,j}^2} \leq \text{Delta}_j \quad (3)$$

$$\forall_{i,j} A_{i,j} = A_{i,jj}^* \quad (4)$$

$$\forall_{i,k} \quad a_{i,k} = \sum_j G_{j,k} \cdot A_{i,j} \quad (5)$$

$$\forall_{i,k} a_{i,k} = ap_{i,k} - an_{i,k} \quad (6)$$

$$\forall_{i,k} ap_{i,k} - v_i \cdot Yp_{i,k} \geq 0 \quad (7)$$

$$\forall_{i,k} ap_{i,k} \leq M \cdot YP_{i,k} \quad (8)$$

$$\forall_{i,k} an_{i,k} - v_i \cdot Yn_{i,k} \geq 0 \quad (9)$$

$$\forall_{i,k} an_{i,k} \leq M \cdot Yn_{i,k} \quad (10)$$

$$\forall_{i,k} Yp_{i,k} + Yn_{i,k} + Yz_{i,k} = 1 \quad (11)$$

$$ap_{i,k} \geq 0, an_{i,k} \geq 0, Yp_{i,k}, Yn_{i,k}, Yz_{i,k} = [0,1] \quad (12)$$

where:

i represents adjustments (e.g. Weights, Tabs, PCRs);

j represents an order (e.g. vibration order 1 . . Number of Blades−1);

jj is an alias for conjugate order pairs of j;

k represents each blade (e.g. Black, Red, White, . . . Violet);

R(i,j) is the orthonormal projection of vibration coefficients;

G(j,k) is an inverse DFT for an order, blade;

B(i,j) is an orthonormal projection of measured vibration (e.g. $Q^T \cdot u$);

Delta(j) is an error for an order;

v(i) is the minimum allowable adjustment;

A(i,j) is the DFT adjustment for an adjustment, order;

a(i,k) represents the real blade adjustment for an adjustment, blade;

ap(i,k) represents a positive real blade adjustment for an adjustment, blade;

an(i,k) represents negative real blade adjustment for an adjustment, blade;

D(i,j) is a sum of errors for an adjustment, order;

Yp(i,k) is a binary switch for positive real adjustments;

Yn(i,k) is a binary switch for negative real adjustments;

Yz(i,k) is a binary switch for no real adjustments(e.g. adjustment is zero); and (i,j) is the adjustment and a (i,k) is the adjustment in the time domain.

Equation (1) set forth above represents minimizing the vibrations. Equations (2) and (3) represent determining an adjustment that provides a final vibration value that is within an acceptable range (e.g., the error space of all the adjustments and measurements), as discussed above. Equation (4) represents the fact that the solution for conjugate pairs is the same, which allows for certain optimizations. Thus, equations (1) through (4) represent minimizing the weight norm matrix, $a^T \cdot E \cdot a$, subject to the constraint discussed above of $$\|Q^T \cdot u + R \cdot a\| < \delta.$$

Equation (5) above represents obtaining the time domain version of the adjustment by converting a frequency domain version of the adjustment, $A_{i,j}$, into the time domain version, $a_{i,j}$. Equations (6) through (12) represent examining the positive and negative portions of the adjustment to determine if either is above a predetermined minimum allowable adjustment or, alternatively, the adjustment is zero. If any of these conditions hold, the adjustment is acceptable.

Figure 7:
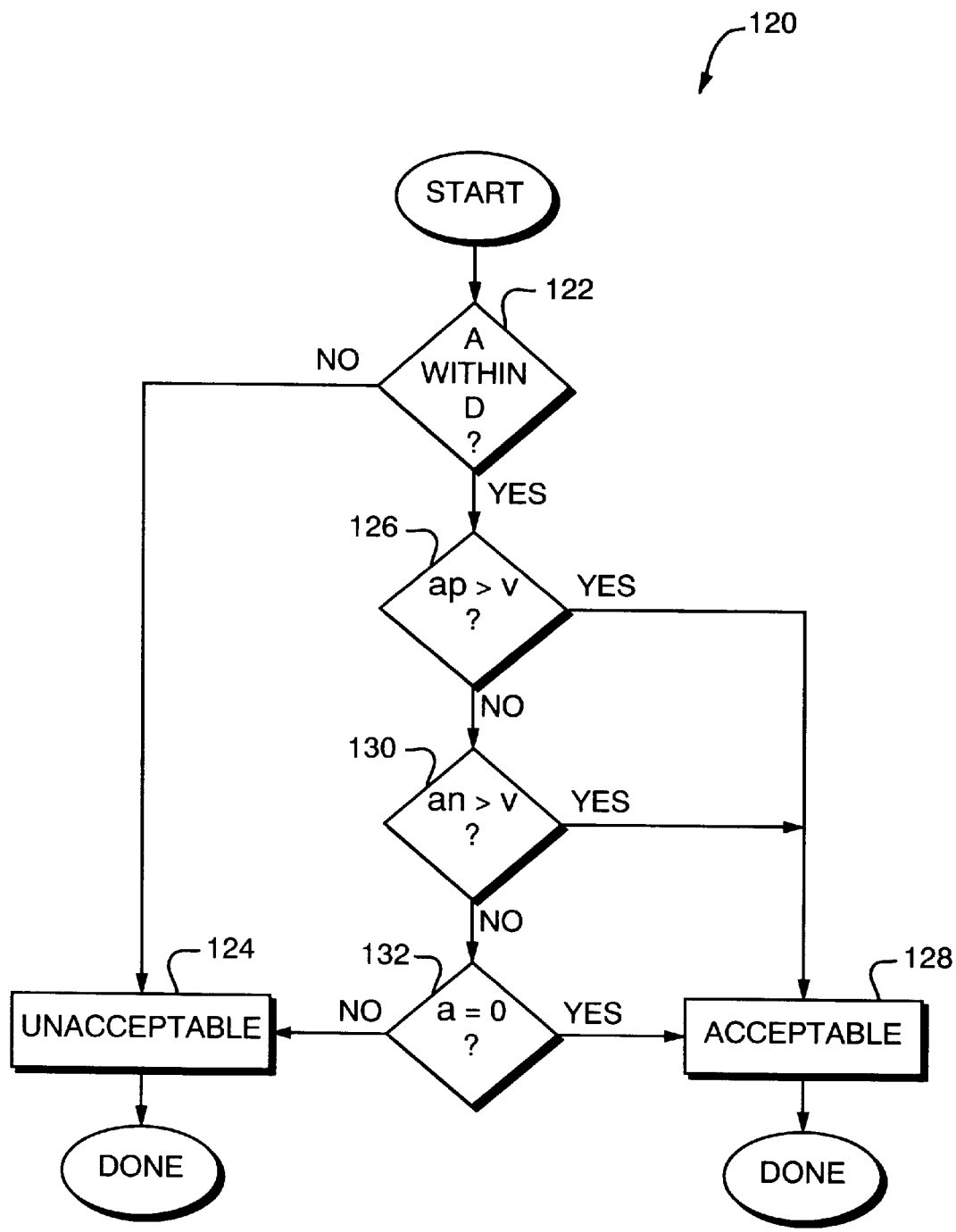
FIG. 7 is a flow chart illustrating steps performed in connection with analyzing data according to the system described herein.

Referring to FIG. 7, a flowchart 120 illustrates operations corresponding to the equations 1–12, set forth about. Processing begins at a first test step 122 where it is determined if a particular adjustment is within the allowable range of solutions. That is, at the step 122 it is determined whether a particular adjustment provides an acceptable level of vibrations that is less than or equal to the pre-determined acceptable amount that may be set, for example, according to the sum of expected errors in the system, as discussed above. If it is determined at the test step 122 that a particular set of adjustments does not provide an acceptable level of vibrations, then control passes from step 122 to a step 124 where it is indicated that the adjustment tested at the step 122 is unacceptable. Following step 124, processing is complete.

If it is determined at the test step 122 that a particular adjustment does provide an acceptable level of vibrations, then control passes from a step 122 to a test step 126 where it is determined if the positive real portion of the adjustment (shown at the step 126 as ap) is greater than a predetermined value, v. As an example, if the adjustment being tested at the step 126 is a tab adjustment, then v can be set to 2°, thus indicating that a positive tab adjustment of more than 2° is acceptable. If it is determined at the test step 126 that the positive real portion of the adjustment is greater than the pre-determined value, v, then control passes from the test step 126 to a step 128 where tie adjustment is deemed acceptable. Following the step 128, processing is complete.

Alternative, if it is determined at the test step 126 that the positive portion of the adjustment is not greater than the pre-determined value v, then control passes from the test step 126 to a test step 130 where it is determined if the absolute value of the negative real portion of 20 the adjustment is greater than the pre-determined value, v. The step 130 may represent, for example, testing a possible negative tab adjustment of −3° in an instance where any adjustment over 2° is deemed acceptable. The quantity an shown at the test step 130 is the absolute value of the negative portion of the adjustment. If it is determined that the test step 130 that the absolute value of the negative real portion of the adjustment is greater than the pre-determined value v, then control passes from the step 130 to the step 128, where the adjustment is deemed acceptable.

Alternative, if it is determined that test step 130 that the absolute value of the negative portion of the adjustment is not greater than the pre-determined value, v, then control passes from the step 130 to the step 132 where it is determined if the adjustment is zero. If it is determined at the test step 132 that the adjustment is zero, then control passes from the step 130 to the step 128, where the adjustment is deemed acceptable. Otherwise, if the adjustment is not found to be zero at the step 132, then control passes from the step 132 to the step 124, where the adjustment is deemed unacceptable.

Note that the flow chart 120 of FIG. 7 represents testing of a possible adjustment. For the system described herein, the processing of FIG. 7 could be applied to a plurality of adjustments, with an ending condition being the first possible adjustment deemed acceptable. The set of adjustments processed according to FIG. 7 may include a set of all possible adjustments. Alternatively, one or more optimization techniques may be used to select a subset of possible adjustments to test. The possible adjustments that provided for testing may depend upon the results of testing previous possible adjustments.

Figure 8:
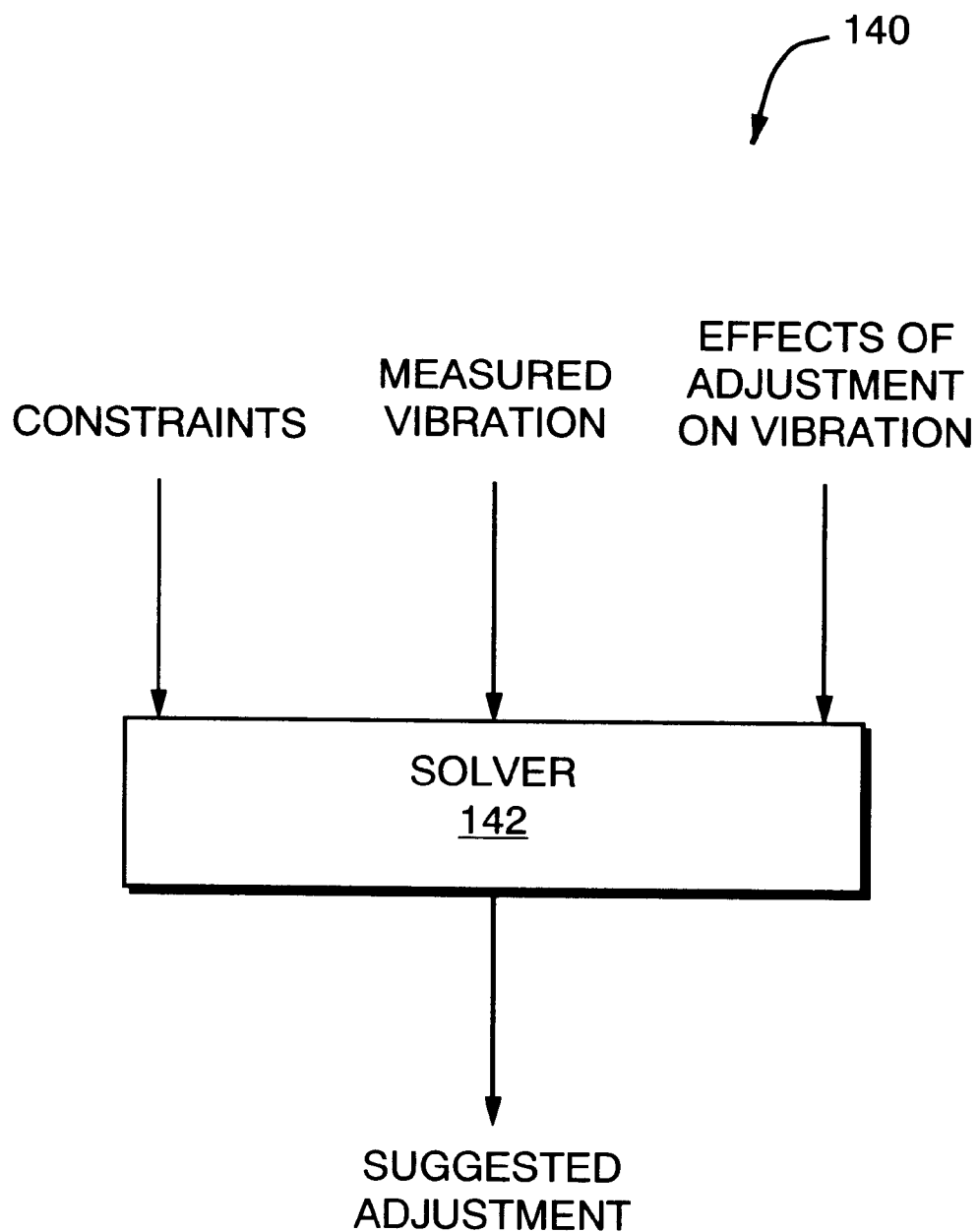
FIG. 8 is a schematic diagram illustrating an embodiment of the system described herein for analyzing data.

Referring to FIG. 8, a schematic diagram 140 shows a solver 142 providing a suggested adjustment as output. The input to the solver 142 includes the constraints, such as those discussed above in connection with equations 1–12. The other inputs to the solver 142 include the measured vibrations and data indicating the effect of adjustments on vibrations. Note that the solver 142 may process the measured vibrations and the effects of adjustment on vibrations in a manner similar to that discussed above. Alternatively, the solver 142 may apply other techniques for obtaining one or more suggested adjustments that are subject to the constraints that cause the adjustments to be above a certain amount or zero, in accordance with the equations (1)–(12), discussed above.

Figure 9:
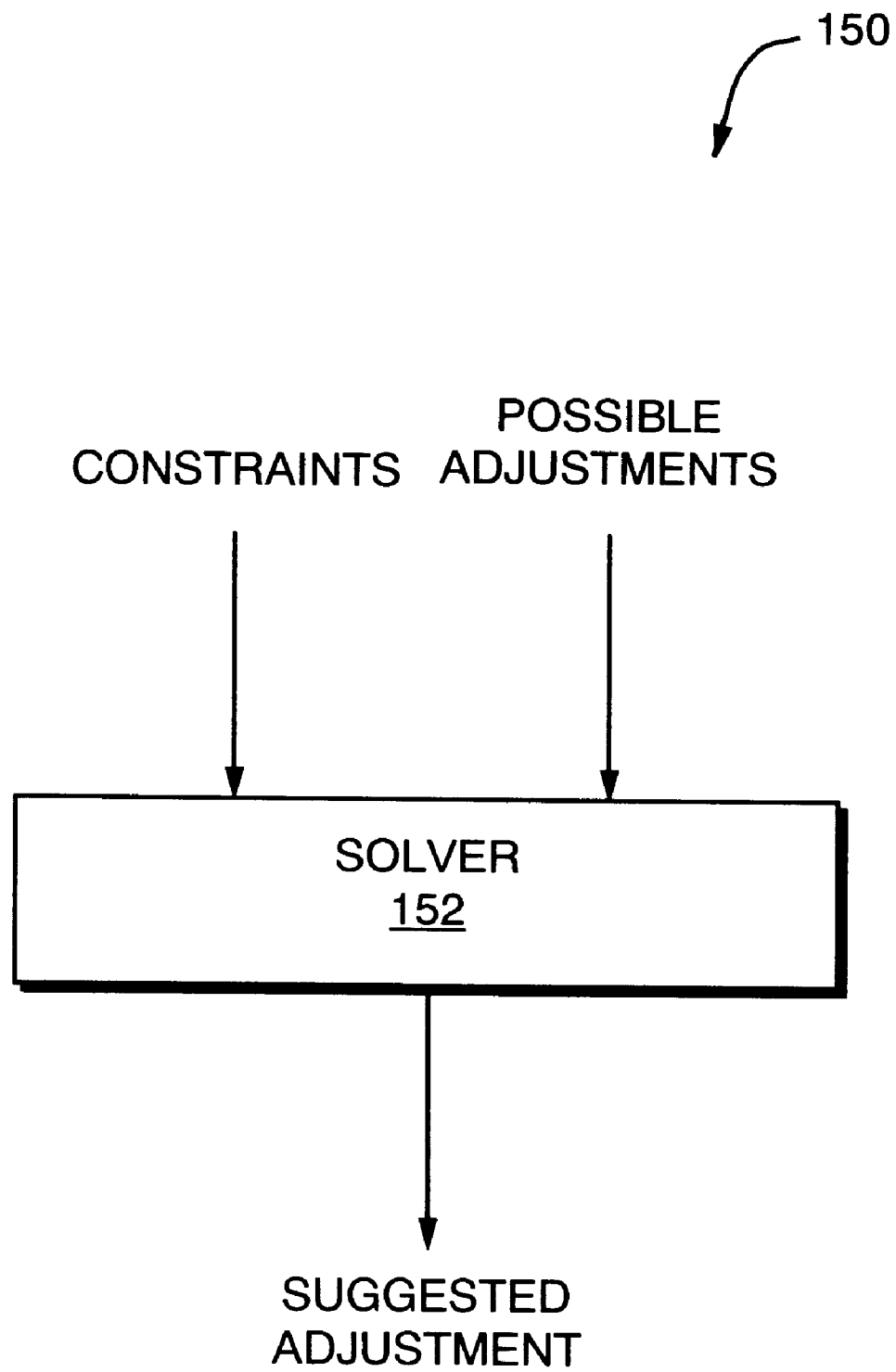
FIG. 9 is a schematic diagram illustrating an other embodiment of the system described herein for analyzing data.

Referring to FIG. 9, a schematic diagram 150 shows a solver 152 that is provided with a set of possible adjustments as an input and provides a suggested adjustment as an output. The solver 152 also shows constraints as an input. However, in this case, the constraints that are input to the solver may correspond only to equations 5–12, set forth above. That is, the possible adjustments that are input to the solver 152 are obtained by any technique, such as that disclosed herein or another technique. Then, the possible adjustments are examined and subject to the constraints of equations (5)–(12), discussed above, where only adjustments that are either zero or above a certain amount are deemed acceptable. Thus, the solver 152 can apply the constraints of equations (5)–(12) to any set of possible adjustments, no matter how obtained. Note that the solver 152 may correspond to the flow chart 120 of FIG. 7 with processing beginning at the step 126 where the inputs are possible adjustments obtained by another technique. Note also that any of the data processing techniques and arrangements discussed herein may be applied to either of the solvers 142, 152, so that, for example, one of the solvers 142, 152 may operate on the aircraft or may operate off of the aircraft using data collected from the aircraft.

Figure 10:
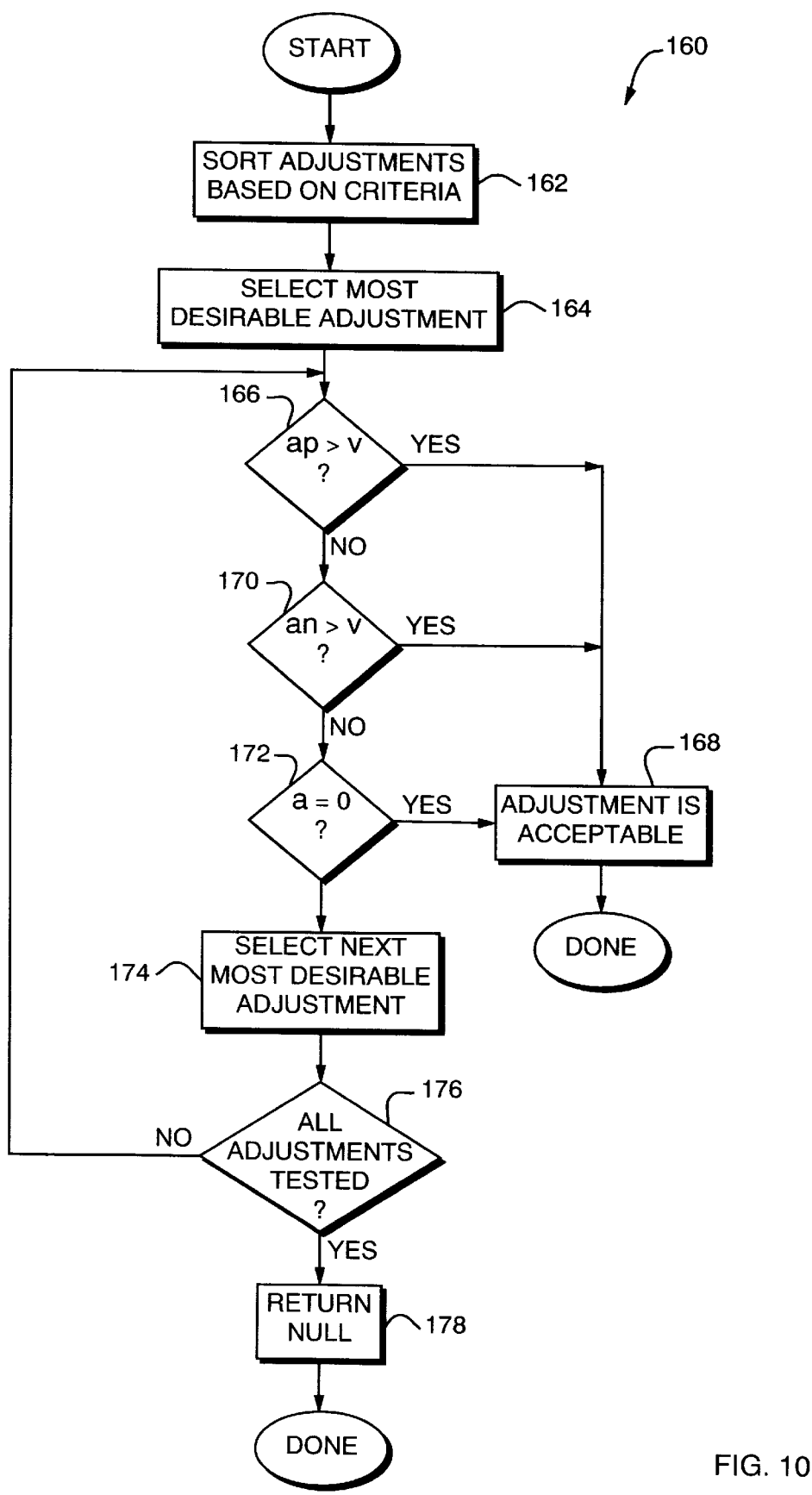
FIG. 10 is a flow chart illustrating steps performed in connection with analyzing data according to the system described herein.

Referring to FIG. 10, a flow chart 160 illustrates a more generalized version of the operations corresponding to the equations 5–12, set forth about. Processing begins at a first step where the possible sets of adjustments are sorted based on some predetermined criteria. For example, the adjustments may be sorted based on equation 1, set forth above, subject to discarding (i.e., not using) any sets of adjustments that do not meet the criteria of equations 2–4, set forth above. Any other suitable criteria may be used at the step 162. Following the step 162 is a step 164 where the first set of adjustments (i.e., the set being most desirable according to the criteria used for sorting at the step 162) is selected for testing. Following the step 164 is a test step 166 where it is determined if the positive real portion of the adjustment being tested (shown at the step 166 as ap) is greater than a pre-determined value, v. As an example, if the adjustment being tested at the step 166 is a tab adjustment, then v can be set to 2°, thus indicating that a positive tab adjustment of more than 2° is acceptable. If it is determined at the test step 166 that the positive real portion of the adjustment is greater than the pre-determined value, v, then control passes from the test step 166 to a step 168 where the adjustment is deemed acceptable. Following the step 168, processing is complete.

Alternative, if it is determined at the test step 166 that the positive portion of the adjustment is not greater than the pre-determined value v, then control passes from the test step 166 to a test step 170 where it is determined if the absolute value of the negative real portion of the adjustment is greater than the pre-determined value, v. The step 170 may represent, for example, testing a possible negative tab adjustment of −3° in an instance where any adjustment over 2° is deemed acceptable. The quantity an shown at the test step 170 is the absolute value of the negative portion of the adjustment. If it is determined that the test step 170 that the absolute value of the negative real portion of the adjustment is greater than the pre-determined value v, then control passes from the step 170 to the step 168, where the adjustment is deemed acceptable. Alternative, if it is determined that test step 170 that the absolute value of the negative portion of the adjustment is not greater than the pre-determined value, v, then control passes from the step 170 to the step 172 where it is determined if the adjustment is zero. If it is determined at the test step 172 that the adjustment is zero, then control passes from the step 170 to the step 168, where the adjustment is deemed acceptable. Otherwise, if the adjustment is not found to be zero at the step 172, then control passes from the step 172 to a step 174, to select the next adjustment (i.e., the next most desirable adjustment based on the criteria at the step 162). Following the step 174 is a test step 176, where it is determined if all of the adjustments have been tested (i.e., the least desirable adjustment was tested at the previous iteration). If it is determined at the step 176 that all of the adjustments have not been tested, then control passes from the step 176 back to the step 166, discussed above. Otherwise, if all of the adjustments have been tested, then control passes from the step 176 to a step 178 where a null is returned (or a similar indicator provided) to signal that no acceptable adjustments were found. Following the step 178, processing is complete.

Note that the flow chart 160 of FIG. 10 and the flow chart 120 of FIG. 7 illustrate the steps performed in connection with determining acceptable adjustments. Although the steps are shown and described sequentially and operating on a single test adjustment at a time, the process described in connection with the flow charts 120, 160 may perform parallel, simultaneous, operations and may test and perform other operations in connection with more than one set of adjustments at a time.

While the invention has been disclosed in connection with the preferred embodiments shown and described in detail, various modifications and improvements thereon will become readily apparent to those skilled in the art. Accordingly, the spirit and scope of the present invention is to be limited only by the following claims.

What is claimed is:

1. A method of determining adjustments for rotating blades, comprising:
   measuring a plurality of vibration values corresponding to vibrations caused by the blades;
   providing coefficient of vibration data that corresponds to effects on vibration caused by adjustments to the blades;
   applying the coefficient of vibration data to the vibration values; and
   solving for possible values for the adjustments that may be applied to the blades that result in total vibration caused by the blades being less than a predetermined amount, wherein the possible values for the adjustments are constrained to be greater than a first predetermined value or zero.

2. A method, according to claim 1, wherein the adjustments include at least one of hub weights, blade tabs, PCR adjustments, and blade tip weight adjustments.

3. A method, according to claim 1, wherein measuring vibrations includes obtaining signals from a plurality of accelerometers.

4. A method, according to claim 1, further comprising:
   performing an FFT on the vibration data, wherein the data indicating effects on vibration is provided in the frequency domain.

5. A method, according to claim 4, wherein applying the data to the vibration values is performed in the frequency domain.

6. A method, according to claim 5, wherein the vibration values, the coefficient of vibration data, and the adjustments are all matrixes.

7. A method, according to claim 6, wherein the vibration values include a first matrix, u, corresponding to measured vibrations and a second matrix, v, corresponding to desired vibrations.

8. A method, according to claim 7, wherein solving for possible values for the adjustments uses the equation:

$$v = u + X \cdot a$$

where a represents the adjustment and X represents the coefficient of vibration data.

9. A method, according to claim 8, wherein solving for possible values of the adjustments includes replacing X with $Q \cdot R$, where $Q^T \cdot Q$ equals the identity matrix, I and R is an upper triangular matrix.

10. A method, according to claim 9, wherein solving for possible values of the adjustments includes evaluating $\|Q^T \cdot u + R \cdot a\|$.

11. A method of determining adjustments for rotating blades, comprising:
    sorting sets of possible adjustments for the blades based on a predetermined criteria; and
    selecting a set from the sets of possible adjustments that is constrained so that all of the adjustments of the set are greater than a first predetermined value or zero and that result in total vibration caused by the blades being less than a predetermined amount.

12. A method, according to claim 11, wherein the adjustments include at least one of hub weights, blade tabs, PCR adjustments, and blade tip weight adjustments.

13. A method, according to claim 11, wherein sorting sets of possible adjustments includes:
    measuring a plurality of vibration values corresponding to vibrations caused by the blades;
    providing coefficient of vibration data that corresponds to effects on vibration values caused by sets of possible adjustment applied to the blades;
    applying the coefficient of vibration data to the vibration values to predict an effect on vibration values caused by each of the sets of possible adjustments; and
    sorting the sets of possible adjustments according to the effect on vibration values for each of the sets.

14. A method, according to claim 13, wherein measuring vibrations includes obtaining signals from a plurality of accelerometers.

15. A method, according to claim 11, wherein the predetermined criteria is a measure of an amount of vibrations caused by a set of adjustments.

16. A method, according to claim 15, further comprising:
    deselecting sets of adjustments that result in vibrations greater than a predetermined amount.

17. Computer software that determines adjustments for rotating blades, comprising:
    executable code that receives a plurality of vibration values corresponding to vibrations caused by the blades;
    executable code that accesses coefficient of vibration data that corresponds to effects on vibration caused by adjustments to the blades;
    executable code that applies the coefficient of vibration data to the vibration values; and
    executable code that solves for possible values for the adjustments that may be applied to the blades that result in total vibration caused by the blades being less than a predetermined amount, wherein the possible values for the adjustments are constrained to be greater than a first predetermined value or zero.

18. Computer software, according to claim 17, wherein the plurality of vibration values is provided by signals from a plurality of accelerometers.

19. Computer software that determines adjustments for rotating blades, comprising:
    executable code that receives sets of possible adjustments for the blades sorted based on a predetermined criteria; and
    executable code that selects a set from the sets of possible adjustments that is constrained so that all of the adjustments of the set are greater than a first predetermined value or zero and that result in total vibration caused by the blades being less than a redetermined amount.

20. Computer software, according to claim 19, wherein the adjustments include at least one of hub weights, blade tabs, PCR adjustments, and blade tip weight adjustments.

21. Computer software, according to claim 19, further comprising:
- executable code that receives a plurality of vibration values corresponding to vibrations caused by the blades;
- executable code that accesses coefficient of vibration data that corresponds to effects on vibration values caused by sets of possible adjustment applied to the blades;
- executable code that applies the coefficient of vibration data to the vibration values to predict an effect on vibration values caused by each of the sets of possible adjustments; and
- executable code that sorts the sets of possible adjustments according to the effect on vibration values for each of the sets.

22. Computer software, according to claim 21, wherein the vibration values include signals from a plurality of accelerometers.

23. Computer software, according to claim 19, wherein the predetermined criteria is a measure of an amount of vibrations caused by a set of adjustments.

24. Computer software, according to claim 23, further comprising:
- executable code that deselects sets of adjustments that result in vibrations greater than a predetermined amount.

25. An apparatus that determines adjustments for rotating blades, comprising:
- means for receiving a plurality of vibration values corresponding to vibrations caused by the blades;
- means for accessing coefficient of vibration data that corresponds to effects on vibration values caused by sets of possible adjustments applied to the blades;
- means for applying the coefficient of vibration data to the vibration values; and
- means for solving for possible values for the adjustments that may be applied to the blades that result in total vibration caused by the blades being less than a predetermined amount, wherein the possible values for the adjustments are constrained to be greater than a first predetermined value or zero.

26. Apparatus, according to claim 25, wherein the adjustments include at least one of hub weights, blade tabs, PCR adjustments, and blade tip weight adjustments.

27. Apparatus, according to claim 25, wherein the means for measuring vibrations includes means for obtaining signals from a plurality of accelerometers.

28. Apparatus, according to claim 25, wherein said means for receiving a plurality of vibration values includes a first input.

29. Apparatus, according to claim 28, wherein said means for accessing coefficient of vibration data includes a second input.

30. Apparatus, according to claim 29, wherein said predetermined value is provided by a third input.

31. An apparatus that determines adjustments for rotating blades, comprising:
- means for receiving sets of possible adjustments for the blades that are sorted based on a predetermined criteria; and
- means for selecting a set from the sets of possible adjustments that is constrained so that all of the adjustments of the set are greater than a first predetermined value or zero and that result in total vibration caused by the blades being less than a predetermined amount.

32. An apparatus, according to claim 31, wherein the adjustments include at least one of hub weights, blade tabs, PCR adjustments, and blade tip weight adjustments.

33. An apparatus, according to claim 31, further comprising:
- means for receiving a plurality of vibration values corresponding to vibrations caused by the blades;
- means for accessing coefficient of vibration data that corresponds to effects on vibration values caused by sets of possible adjustment applied to the blades;
- means for applying the coefficient of vibration data to the vibration values to predict an effect on vibration values caused by each of the sets of possible adjustments; and
- means for sorting the sets of possible adjustments according to the effect on vibration values for each of the sets.

34. An apparatus, according to claim 33, wherein said vibration values are provided by signals from a plurality of accelerometers.

35. An apparatus, according to claim 31, wherein the predetermined criteria is a measure of an amount of vibrations caused by a set of adjustments.

36. An apparatus, according to claim 35, further comprising:
- means for deselecting sets of adjustments that result in vibrations greater than a predetermined amount.

* * * * *